2,716,735
Patented Aug. 30, 1955

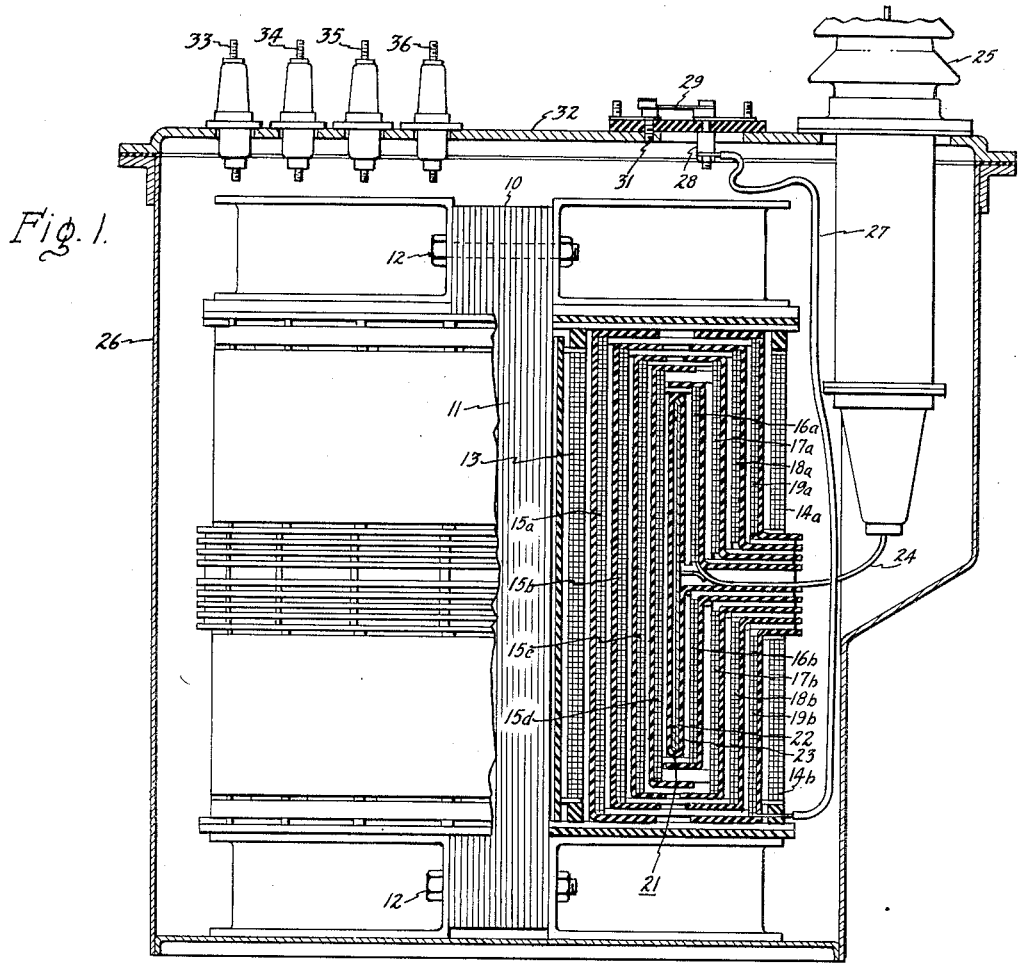

2,716,735
ELECTRICAL INDUCTION APPARATUS

Stanley B. Williams, Pittsfield, Mass., assignor to General Electric Company, a corporation of New York Application November 20, 1953, Serial No. 393,361

7 Claims. (Cl. 336—70)

This invention relates to electrical induction apparatus such as transformers and reactors and particularly to apparatus of this type for operation at high voltage.

U. S. Patent 2,217,442, granted October 8, 1940 in the name of Allan B. Hendricks, Jr. to the assignee of the present application, disclosed and claimed a transformer having low eddy current losses, excellent utilization of space and materials and inherently good voltage distribution in the high voltage winding under transient voltage surges. The Hendricks device comprised a magnetic core having a winding leg, two spaced conductive cylinders connected to ground and surrounding the winding leg, a high voltage winding between the cylinders and including an inner group of spaced cylindrical sections of different lengths and an outer group of spaced cylindrical sections of different lengths surrounding the inner group, and a conductive cylinder between the two groups of winding sections and connected to the terminal of an adjacent section, the winding sections being connected in series with successive sections disposed alternately in the two groups, the successive winding sections of each group being disposed in opposite radial order from that of the sections of the other group, the lengths and spacings of the winding sections of each group and the specific capacitance of the insulation between the sections being proportioned to produce a capacitance network for initially distributing a high transient voltage substantially uniformly throughout the winding.

While the Hendrick's device offered many advantages the structure whereby a line terminal was brought out through the top of the winding structure greatly complicated the problem of providing adequate supports for the coils at the top end. Furthermore, this structure required a very complex and uneconomical insulation structure in order to get the proper amount of dielectric material and spacing between the line terminal and other parts of the high-voltage and low-voltage windings and also the transformer core and clamps. Therefore, it is an object of the present invention to provide electrical induction apparatus for high-voltage use in which the line terminal lead is brought out at the side of the apparatus.

Another object of the invention is to provide electrical induction apparatus in which the insulation between the high-voltage and low-voltage portions is arranged for maximum efficiency and economy of material.

Other objects of the invention will be apparent from the following specification taken in connection with the attached drawing in which Fig. 1 is a sectional elevation view of a transformer constructed in accordance with the invention and Fig. 2 is a diagrammatic view illustrating the connection of the windings of the transformer illustrated in Fig. 1.

Briefly stated, in accordance with one of its aspects, the invention comprises a magnetic core having a winding leg, and a high-voltage winding surrounding the winding leg and including an inner group of cylindrical layers of conductive turns and an outer group of cylindrical layers of conductive turns surrounding the inner group, each layer of turns of the outer group consisting of two sets of turns spaced from each other near the center of the layer, the lengths of the layers of turns of each group progressively decreasing toward the other group, the spacing of the two sets of turns in each layer of the outer group increasing outwardly, the lengths and spacing of the layers of conductive turns and the specific capacitances of the insulation between the layers being proportioned to produce a capacitance network for initially distributing the high transient voltage substantially uniformily throughout the winding.

The transformer shown in Fig. 1 includes a magnetic core 10 consisting of a plurality of laminations maintained in abutting relationship by bolts 12 and having a vertical winding leg 11. The winding leg 11 is surrounded by two layers of concentrally spaced cylindrical low-voltage windings consisting of an inner layer 13 and an outer layer having windings 14a and 14b of about equal length with a gap therebetween in which is positioned a plurality of layers of insulating material. Between the low voltage windings are two groups of high voltage windings, the first consisting of four windings 15a, 15b, 15c, and 15d, which are of decreasing length with increasing radial distance, and the second consisting of four layers of windings with two sets of windings in each layer, the inner layer consisting of the windings 16a—16b, the next layer the windings 17a—17b, the next layer the windings 18a—18b, and the outermost layer the windings 19a—19b. As in the case of the low voltage windings 14a—14b, the two windings comprising each layer of the outer group of high voltage windings are of about equal length and are separated by a gap of increasing width as the radial distance of the windings increases.

Positioned between the two groups of high voltage windings is an electrostatic cylinder or sleeve 21 connected to the line and consisting of a concentric metal cylinder 22 surrounded by an insulating layer 23 except for one spot where a lead may be connected to the cylinder 22. The gaps between the windings of each layer of the outer group of windings are symmetrically spaced so as to provide a passageway for a high voltage lead 24 leading to a bushing structure 25 mounted at the side of a tank 26 in which the coil and core assembly is positioned. The high-voltage winding 19b is connected by a conductor 27, an insulator 28, and a spring 29 to a grounded stud 31 mounted upon a cover 32 of the tank 26. The high voltage-winding is thus connected between the grounded stud 31 and the high-voltage lead 24 of the transformer. With the spring 29 pressing against the grounded stud 31 one end of the high voltage winding is connected directly to ground.

Also mounted upon the cover 32 are four low-voltage terminals, 33, 34, 35, and 36. Two low-voltage terminals are sufficient in most installations. The connection of the low-voltage windings to the terminals 33—36 has been omitted from Fig. 1 for purposes of clarity of illustration; however, Fig. 2 illustrates the circuit connecting the low-voltage windings as well as the high voltage windings.

In Fig. 2 the various windings, which are shown diagrammatically, are given the same numbers as the same parts in Fig. 1. The low-voltage windings are connected in the series order as 14a—13—14b. The high-voltage lead 24 is connected to the electrostatic cylinder 22 and also through the high-voltage series 16a—15d—16b—17a—15c—17b, a conductor 37, which advances the winding series through the windings 18a—15b—18b to a conductor 38, which further extends the series circuit through the windings 19a—15a—19b. The conductors 37 and 38 may be omitted in which event the tap connections 39, 35, 41 and 36 are utilized to complete the desired circuit.

Because of the relatively opposite radial order in which the successive sections of each of the high voltage winding groups are connected between the ground and the high-voltage terminal, the voltages of the sections in each group are of progressively increasing magnitude from the adjacent low-voltage windings toward the electrostatic cylinder 21. The voltage of the high-voltage winding section nearest the electrostatic cylinder 21 is thus of greatest magnitude in each of the high-voltage winding groups and the voltages of the other high-voltage winding sections in each group are of progressively decreasing magnitude toward the adjacent low-voltage winding.

When a high transient voltage appears on the high-voltage lead 24 of the transformer, the distribution of this voltage along the turns of the high-voltage winding is determined by the capacitance network in accordance with the principles fully explained in the James M. Weed Patent 1,585,448, issued May 18, 1926, and assigned to the General Electric Company. When a high-voltage transient appears on the high-voltage lead 24 the voltage of the electrostatic cylinder 21 is instantly increased to the same value and both groups of high-voltage winding layers are disposed in electrostatic fields induced by the voltage between the electrostatic cylinder 21 and the high-voltage winding layers farthest removed thereof. In order that the initial distribution of a high transient voltage may be substantially uniform throughout the high-voltage winding so that any section of the winding will be subjected only to its proportionate share of the voltage, the high-voltage winding sections or layers of turns in both the inner and outer groups should be so spaced from each other and from the electrostatic cylinder 21 that the capacitances between the layers of turns of each group will be approximately of equal value. It is not necessary, however, that the capacitances between the layers of turns of one group be the same as that between the layers of turns of the other group. Because of the greater lengths and smaller diameters of the layers of turns of the inner high voltage group the capacitances between these inner layers of turns would be approximately the same as those between the shorter layers of turns nearer the electrostatic cylinder 21 if the spacing were the same between all the layers of turns of this group. The lengths and diameters of the layers of turns of the outer group increase slightly as their radial distances increase and the capacitances between these layers of turns of the outer group would increase from the inner to the outer layers of turns if the spacings between the layers of turns were alike. The capacitances between the layers of turns are determined by various factors such as lengths, diameters, and spacings of the layers of turns and the specific capacitance of the insulation between the layers. In order to equalize these capacitances the spacings of the longer layers are greater than the spacings of the shorter layers to the extent necessary to assure a substantially uniform initial distribution of high transient voltage.

In the transformer construction which has been described, all of the winding sections are of cylindrical form and are concentrically spaced from each other about a vertical axis. The transformer is arranged to be immersed in an insulating liquid in the tank or casing 26 and the vertical arrangement of the spaced winding sections provides vertical ducts so that the insulating liquid may readily circulate by convection and provide effective cooling of the transformer. The transformer requires an exceedingly small amount of insulation because the high voltage end of the winding is disposed well inside the structure of the winding and both the inner and outer layers of the winding are at or near ground potential. It is obvious that even for a very high voltage winding only a very small amount of insulation is necessary between it and adjacent parts of the transformer. This contributes to extreme compactness and a highly efficient utilization of the winding spaces through the magnetic core with consequent high efficiency, low reactance, small size and weight and low cost. Another inherent advantage of the high-voltage winding arrangement is that the stray magnetic and electrostatic fields are confined almost entirely to the space between the inner and outer sections of the winding and consequently the stray losses caused by these fields are negligible in any adjacent conducting or insulating materials such as the magnetic core 10 with its supports and the casing 26 enclosing the transformer. This permits the use of a casing 26 which closely encloses the core and windings without danger of objectionable losses.

The position of the line lead 24 at the side of the winding structure allows the use of conventional clamps, either adjustable or fixed. The amount of dielectric material and the spacing between the line lead and other parts of the high-voltage and low-voltage windings get progressively greater as the voltage between these parts increases. The progressive increase in insulation is accomplished in a relatively simple manner and with materials that are a part of the winding structure to begin with. The side position of the line lead 24 permits easy connection to a standard line bushing and allows the bushing to be tipped, if necessary.

The invention has been explained by describing and illustrating the details of a particular transformer constructed in accordance with the invention, but it will be apparent that changes may be made without departing from the spirit of the invention and the scope of the appended claims.

What I claim as new and desire to secure by Letters Patent of the United States is:

1. Electrical induction apparatus comprising a magnetic core having a winding leg, and a high voltage winding surrounding said winding leg and including an inner group of a plurality of coaxial cylindrical layers of conductive turns and an outer group of a plurality of coaxial cylindrical layers of conductive turns radially surrounding the inner group, each layer of turns of the outer group consisting of two sets of turns axially spaced from each other near the center of the layer, the lengths of the layers of turns of each group progressively decreasing toward the other group, the axial spacing of the two sets of turns in each layer of the outer group progressively increasing outwardly, the lengths and spacings of the layers of conductive turns and the specific capacitances of the insulation between the layers being proportioned to produce a capacitance network for initially distributing a high transient voltage substantially uniformly throughout the winding, said layers being connected so that the voltages of successive layers of each group are of progressively increasing magnitude toward the other group.

2. Electrical induction apparatus including a magnetic core having a winding leg, an inner group of a plurality of coaxial cylindrical high voltage layers of conductive turns, an outer group of a plurality of coaxial cylindrical high voltage layers of conductive turns radially surrounding the inner group, each layer of said outer group of conductive turns consisting of two sets of turns axially spaced from each other to form an upper and lower set of turns, the axial spacing of the two sets of turns in each layer of the outer group progressively increasing outwardly to define a side exit, a high voltage lead connected to one of the inner turns of said outer group of conductive turns and passing outward through said side exit, the lengths of the layers of conductive turns of each group progressively decreasing toward the other group, and the lengths and spacings of the layers of turns and the specific capacitances of the insulation between the layers being proportioned to produce a capacitance network for initially distributing a high transient voltage substantially uniformly throughout the winding, said layers being series connected so that the voltages of successive layers of each group are of progressively increasing magnitude toward the other group.

3. Electrical induction apparatus including a magnetic core having a winding leg, a conductive cylinder connected to the line and surrounding said winding leg, a high voltage winding having an inner group of turns inside said cylinder and an outer group of turns outside said cylinder, said inner group of turns having layers of decreasing length toward said cylinder, each layer of said outer group of turns consisting of an upper set of turns spaced from a lower set of turns, the spacing between the two sets of turns of each layer increasing as the distance outward from said cylinder increases whereby a side passageway from said high voltage winding is defined, a high-voltage conductor connected through said passageway to an innermost set of turns of said outer group of turns and to said conducting cylinder, circuits connecting said high voltage turns in series, said circuits successively connecting each layer of the inner group with two sets of turns of the outer group so that the voltages of successive turns of each group are of progressively increasing magnitude toward said conductive cylinder, the lengths and spacings of the winding layers of each group and the specific capacitance of the insulation between the layers being proportioned to produce a capacitance network for initially distributing a high transient voltage substantially uniformly throughout the winding.

4. Electrical induction apparatus including a magnetic core having a winding leg, a high voltage winding surrounding said winding leg and including two coaxial groups of layers of conductive turns, the inner group consisting of a plurality of coaxial concentric layers decreasing in length with increase in radial distance, the outer group consisting of a plurality of coaxial concentric layers each of which has two sets of turns axially spaced from each other near their respective centers to define a central passageway leading from the apparatus, the layers of the outer group increasing in length with increase in radial distance, the capacitances between adjacent layers of turns of each group being substantially equal, and a high voltage conductor leading through said passageway into engagement with one of the inner sets of turns of the outer group of layers, said layers being series connected with each inner group layer being connected to two sets of turns of said outer group so that the voltages of successive layers of each group are of progressively increasing magnitude toward the outer group.

5. Electrical induction apparatus including a magnetic core having a winding leg, a plurality of layers of coaxial concentric windings surrounding said winding leg, said windings consisting of a single low-voltage winding as the innermost winding layer and two low-voltage windings as the outermost winding layer, said outermost low-voltage windings being about equal in length and axially spaced from each other, said innermost low voltage winding being electrically connected in series between said outermost low voltage windings, an inner group of layers of high-voltage windings and an outer group of layers of high-voltage windings positioned between said low-voltage layers, the inner group of high-voltage windings being of decreasing length as the radial distance increases, the outer group of high-voltage windings having in each layer two sets of turns of about equal length and axially spaced from each other, the length of said outer group of high-voltage winding layers progressively increasing as the radial distance increases, the space between the outer group sets of turns defining a side passageway, and a high-voltage lead extending from one of the innermost of the outer group of high-voltage windings through said passageway, said layers being series connected with each inner group layer being connected to two sets of turns of said outer group so that the voltages of successive layers of each group are of progressively increasing magnitude toward the outer group.

6. Electrical induction apparatus including a magnetic core having a winding leg, a plurality of layers of concentric windings surrounding said winding leg, said windings consisting of a single low-voltage winding as the innermost winding layer and two low-voltage windings as the outermost winding layer, said outermost low-voltage windings being about equal in length and spaced from each other, said innermost low voltage winding being electrically connected in series between said outermost low voltage windings, an inner group of layers of high-voltage windings and an outer group of layers of high-voltage windings positioned between said low-voltage layers, a conducting cylinder positioned between said two groups of high-voltage windings, the inner group of high-voltage windings being of decreasing length as the radial distance increases, the outer group of high-voltage windings having in each layer two sets of turns of about equal length and spaced from each other, the lengths of said outer group of high voltage winding layers increasing as the radial distance increases, the space between the outer group sets of turns defining a passageway from said cylinder, and a high-voltage conductor extending through said passageway to said conducting cylinder and one of the innermost of the outer group of high-voltage windings, said layers being series connected with each inner group layer being connected to two sets of turns of said outer group so that the voltages of successive layers of each group are of progressively increasing magnitude toward the outer group.

7. Electrical induction apparatus including a magnetic core having a winding leg, a plurality of layers of concentric windings surrounding said winding leg, said windings consisting of a single low-voltage winding as the innermost winding layer and two low-voltage windings as the outermost winding layer, said outermost low-voltage windings being about equal in length and spaced from each other, said innermost low voltage winding being electrically connected in series between said outermost low voltage windings, an inner group of layers of high-voltage windings and an outer group of layers of high-voltage windings positioned between said low-voltage winding layers, a conducting cylinder positioned between said two groups of high-voltage windings, the inner group of high-voltage windings being of decreasing length as their radial distance increases, the outer group of high-voltage windings having in each layer two sets of turns of about equal length and spaced from each other, the lengths of said outer group of high voltage winding layers increasing as the radial distance increases, the space between the outer group sets of turns combining with the space between the outermost low-voltage windings to define a passage way leading between the turns of each outer group layer, a high voltage conductor positioned in said passageway and connected to said conducting cylinder and also to an end of one of the innermost of the outer group of high-voltage windings, and a circuit connecting the other end of said one innermost outer group high voltage winding through the outermost of the inner group of high-voltage windings thence through the other of the innermost of the outer group of high-voltage windings, thence to through one of the next innermost of the outer group of windings, thence through the next outermost of the inner group of windings, and thence through the other of the next innermost of the outer group of windings.

References Cited in the file of this patent

UNITED STATES PATENTS

| 1,935,182 | Fischer | Nov. 14, 1933 |
| 2,217,442 | Hendricks, Jr. | Oct. 8, 1940 |